US010149262B2

(12) United States Patent
Hamauzu

(10) Patent No.: US 10,149,262 B2
(45) Date of Patent: Dec. 4, 2018

(54) DATA SYNCHRONIZATION ACROSS PLURAL TERMINALS BY MANAGEMENT OF PARENT AND CHILD USER IDENTIFICATION INFORMATION

(71) Applicant: CANON KABUSHIKI KAISHA, Tokyo (JP)

(72) Inventor: Susumu Hamauzu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 15/132,426

(22) Filed: Apr. 19, 2016

(65) Prior Publication Data

US 2016/0337996 A1    Nov. 17, 2016

(30) Foreign Application Priority Data

May 11, 2015 (JP) .................................. 2015-096283

(51) Int. Cl.
    *H04W 56/00*     (2009.01)
    *H04W 76/11*     (2018.01)

(52) U.S. Cl.
    CPC .......... *H04W 56/002* (2013.01); *H04W 76/11* (2018.02)

(58) Field of Classification Search
    CPC .......................... H04W 56/002; H04W 76/021
    See application file for complete search history.

(56) References Cited

U.S. PATENT DOCUMENTS

| 6,026,303 | A  | * | 2/2000  | Minamisawa | ........ H04W 84/20 455/446 |
| 7,143,194 | B1 | * | 11/2006 | Curley | .............. G06F 17/30581 709/248 |
| 7,853,703 | B1 | * | 12/2010 | McBarron | .............. G06Q 10/00 455/412.1 |
| 8,544,072 | B1 | * | 9/2013  | Masone | .............. H04L 63/0815 726/10 |
| 8,793,509 | B1 | * | 7/2014  | Nelson | .................. G06F 21/335 380/227 |
| 9,027,099 | B1 | * | 5/2015  | Saylor | ..................... G06F 21/36 705/64 |
| 9,152,401 | B2 | * | 10/2015 | Hayton | ..................... G06F 8/60 |
| 9,299,102 | B1 | * | 3/2016  | Pike | .................. G06Q 30/0641 |

(Continued)

FOREIGN PATENT DOCUMENTS

JP      2012-79042 A      4/2012

*Primary Examiner* — Tejis Daya
(74) *Attorney, Agent, or Firm* — Fitzpatrick, Cella, Harper & Scinto

(57) ABSTRACT

An information processing apparatus communicates with a plurality of terminals having same user identification information and communicates with a server for performing a data synchronization among the plurality of terminals on the basis of the user identification information. The information processing apparatus comprises: a unit for managing the user identification information and terminal identification information of the plurality of terminals in association with each other; a unit for forming new user identification information different from the user identification information for a designated terminal among the plurality of terminals; a unit for registering the formed new user identification information into the server; and a unit for transmitting the formed new user identification information to the designated terminal.

4 Claims, 8 Drawing Sheets

(56) References Cited

U.S. PATENT DOCUMENTS

| | | | |
|---|---|---|---|
| 9,697,269 B2* | 7/2017 | Koorapati | G06F 17/30575 |
| 9,710,248 B2* | 7/2017 | Sawaya | G06F 8/61 |
| 9,824,208 B2* | 11/2017 | Cavanagh | G06F 21/46 |
| 9,888,072 B2* | 2/2018 | Watts, Jr. | H04L 67/1095 |
| 2001/0044339 A1* | 11/2001 | Cordero | A63F 13/12 463/42 |
| 2002/0049806 A1* | 4/2002 | Gatz | G06F 21/62 709/203 |
| 2002/0178366 A1* | 11/2002 | Ofir | G06F 21/6245 713/182 |
| 2003/0005135 A1* | 1/2003 | Inoue | G06F 21/10 709/229 |
| 2005/0273843 A1* | 12/2005 | Shigeeda | H04L 9/3213 726/5 |
| 2007/0214508 A1* | 9/2007 | Fukui | H04N 1/00501 726/28 |
| 2008/0233957 A1* | 9/2008 | Akama | H04M 1/274516 455/435.1 |
| 2009/0248867 A1* | 10/2009 | Kishimoto | H04L 41/042 709/224 |
| 2011/0099291 A1* | 4/2011 | O'Reirdan | G06Q 10/107 709/238 |
| 2012/0023548 A1* | 1/2012 | Alfano | G06F 21/6218 726/2 |
| 2013/0017806 A1* | 1/2013 | Sprigg | H04M 1/66 455/411 |
| 2013/0041959 A1* | 2/2013 | Bengtsson | H04L 51/14 709/206 |
| 2013/0138738 A1* | 5/2013 | Li | H04L 65/403 709/204 |
| 2013/0219070 A1* | 8/2013 | Kramarenko | H04L 65/1069 709/227 |
| 2013/0225151 A1* | 8/2013 | King | H04M 1/72577 455/419 |
| 2013/0267196 A1* | 10/2013 | Leemet | H04M 15/58 455/405 |
| 2014/0032710 A1* | 1/2014 | Shin | H04L 67/1095 709/217 |
| 2014/0150068 A1* | 5/2014 | Janzer | H04L 63/20 726/4 |
| 2014/0161264 A1* | 6/2014 | Kirkbak | G08B 21/182 381/56 |
| 2014/0185455 A1* | 7/2014 | Balasubramanian | H04W 4/06 370/241 |
| 2014/0307727 A1* | 10/2014 | Cha | H04W 56/00 370/350 |
| 2015/0029979 A1* | 1/2015 | Onodera | H04W 72/121 370/329 |
| 2016/0212207 A1* | 7/2016 | Guo | H04L 29/08 |
| 2017/0011214 A1* | 1/2017 | Cavanagh | G06F 21/46 |
| 2017/0318007 A1* | 11/2017 | Cleeve | H04L 63/083 |
| 2017/0357226 A1* | 12/2017 | Lucas | G05B 15/02 |

* cited by examiner

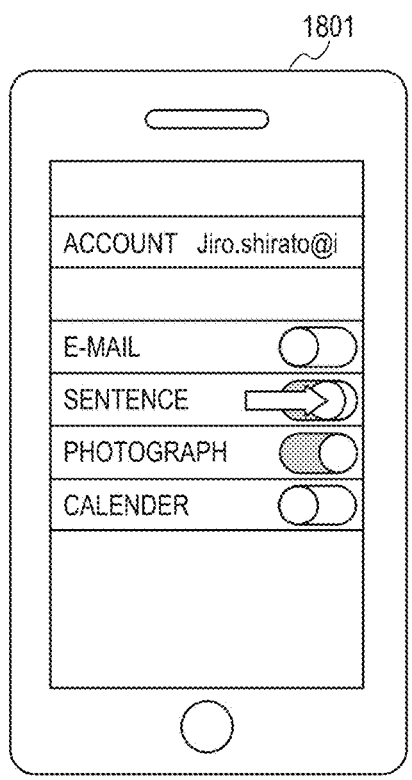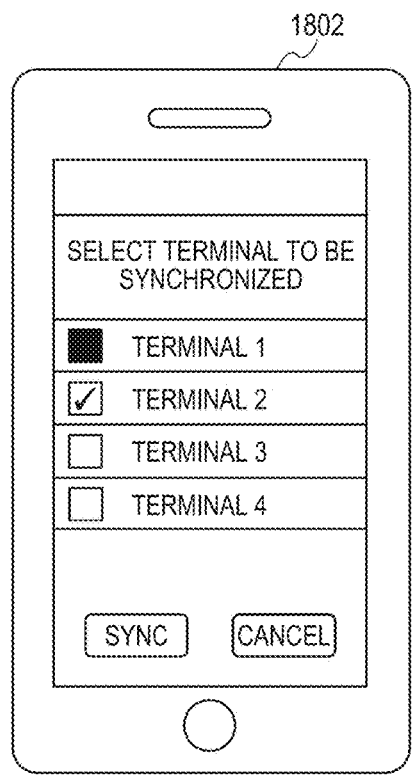

DATA SYNCHRONIZATION ACROSS PLURAL TERMINALS BY MANAGEMENT OF PARENT AND CHILD USER IDENTIFICATION INFORMATION

BACKGROUND OF THE INVENTION

Field of the Invention

The present invention relates to an executing unit and a program for performing a data synchronization of a plurality of terminals which are connected through a network.

Description of the Related Art

In recent years, the number of cases where the user who possesses a plurality of personal digital assistants (simply referred to as terminals hereinbelow) uses a data synchronization service in order to use same data in all possessive terminals has been increased. The data synchronization service is a service for synchronizing data of a plurality of terminals through a cloud service on the Internet. For example, in "iCloud (registered trademark)" of Apple Inc., when the user updates data of an application such as calendar, addressbook, or the like from an application of a certain terminal, the application of the terminal stores the data into a database of the cloud service. When another terminal possessed by the user enters an on-line state, the application of the terminal obtains the data of the application such as calendar, addressbook, or the like from the cloud service. In "Amazon Cognito" of Amazon Co., Ltd., the data of the application of the terminal is synchronized among the plurality of terminals on the basis of "BaaS". In "DROP-BOX (registered trademark)" of DropBox Co., Ltd., when a file is added or updated to subordinates of a specific folder of the possessive terminal of the user, an application in the terminal uploads the file under the domination of the specific folder into an on-line storage. When another terminal possessed by the user enters the on-line state, the application in the terminal downloads the file into the subordinates of the specific folder from the on-line storage.

In the data synchronization service, the application data or the data of the file or the like is managed in association with a user ID. In the plurality of terminals possessed by the user, if the application has already been installed in those terminals and has already been authenticated to the data synchronization service, the application of the terminal can store and obtain data of the user into the data synchronization service. In the data synchronization service, the data which was added, updated, or deleted is managed in the terminal in association with the user ID, and when another terminal is synchronized with the data synchronization service, by transferring information of the addition, updating, or deletion, the data synchronization among the terminals is realized.

However, the method of synchronizing the data which is managed in association with the user ID has such a problem that the data synchronization is performed to all of the terminals using the same ID and the data synchronization cannot be performed only to the designated terminal. For example, in the case where the user selectively uses a plurality of terminals every use purpose such as business use, private use, or the like and he wants to synchronize the data for business use only with the terminal for business use, it is impossible to cope with such a request by the data synchronization associated with the user ID.

As a method of solving such a problem, there is a method whereby a plurality of user IDs are prepared and the user IDs are selectively used every use purpose. Different from the user ID which is used in all of the terminals, a user ID for business use is formed and the data synchronization is performed in the terminal for business use by using the user ID for business use, thereby enabling the data synchronization to be performed only to the terminal for business use. However, according to such a method, it is necessary to preliminarily form the user ID every use purpose. In addition, the user must set a plurality of user IDs to each terminal. Consequently, such a new problem that a troublesomeness for forming and setting the user IDs increases occurs.

As a technique for reducing the troublesomeness for setting a plurality of user IDs, a method whereby a plurality of user IDs possessed by the user are intensively managed in an authenticating system and, after the user authentication, the user IDs which are used by the user are switched has been proposed. (For example, refer to the Japanese Patent Application Laid-Open No. 2012-079042.) According to the technique proposed by the Japanese Patent Application Laid-Open No. 2012-079042, the user ID for authentication and a plurality of user IDs for business use are preliminarily associated with each other and, after the authentication, the user selects the user ID for business use managed in association with the ID for authentication in accordance with the business, thereby reducing a load of setting of a plurality of user IDs.

SUMMARY OF THE INVENTION

According to the technique proposed by the Japanese Patent Application Laid-Open No. 2012-079042, it is necessary to previously form the user IDs and register a parent-child relationship in association with the authenticating server. In order to switch the users, it is also necessary to select and set the user ID every time the users are switched. It is, therefore, an aspect of the invention that in order to perform a data synchronization in which a terminal is designated, a user ID to use a data synchronization service is dynamically formed and the user ID is automatically set to the terminal.

To solve the foregoing problems, the invention provides an information processing apparatus for communicating with a plurality of terminals that have same user identification information and communicating with a server that performs a data synchronization among the plurality of terminals on the basis of the user identification information, the information processing apparatus comprising: a unit configured to manage the user identification information and terminal identification information of the plurality of terminals in association with each other; a unit configured to form new user identification information different from the user identification information for a designated terminal among the plurality of terminals; a unit configured to register the formed new user identification information into the server; and a unit configured to transmit the formed new user identification information to the designated terminal.

According to the invention, the dynamic forming of the user ID to use the data synchronization service and the automatic setting of the user ID to the terminal can be performed. If the data synchronization is performed once by one terminal, the setting is reflected to all terminals.

Further features of the present invention will become apparent from the following description of exemplary embodiments with reference to the attached drawings.

BRIEF DESCRIPTION OF THE DRAWINGS

FIGS. 5A and 5B are diagrams illustrating examples of a data synchronization setting screen according to the embodiment.

DESCRIPTION OF THE EMBODIMENTS

Preferred embodiments of the present invention will now be described in detail in accordance with the accompanying drawings.

Figure 1:
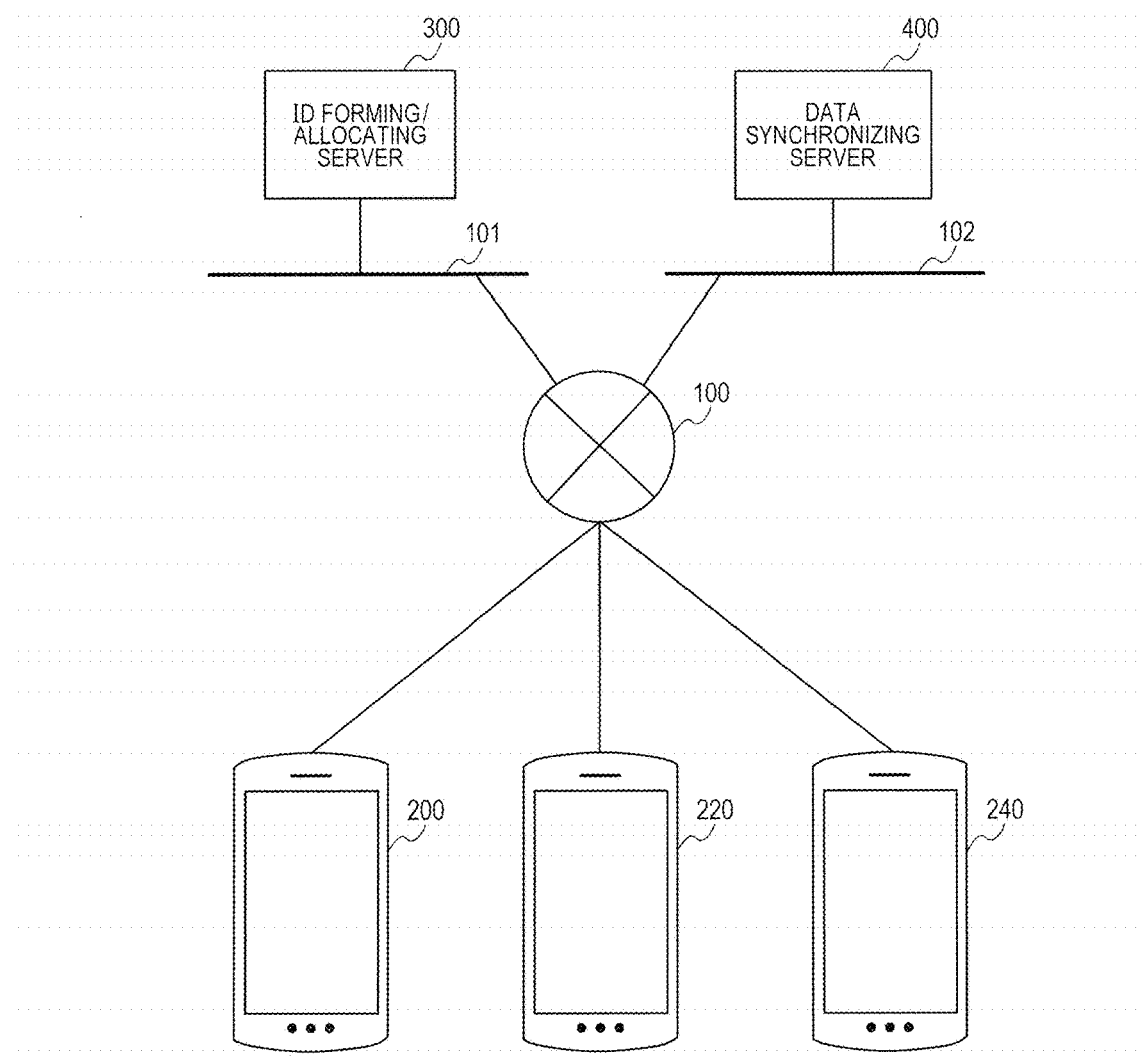
FIG. 1 is a diagram illustrating a system construction according to an embodiment of the invention.

An example of a data synchronizing system according to the embodiment is illustrated in FIG. 1. Two networks are included in this example. One is a Wide Area Network (hereinbelow, abbreviated to "WAN") 100 based on a World Wide Web (WWW) system and the other is Local Area Networks (hereinbelow, abbreviated to "LANs") 101 and 102 for connecting the WAN 100 to each of other component elements. In this example, terminals 200, 220, and 240 which are operated by the user, an ID forming/allocating server 300, and a data synchronizing server 400 are further included. "ID" is an abbreviation of "Identification" and denotes identification information. Particularly, "user ID" indicates user identification information and "terminal ID" indicates terminal identification information.

The terminals 200, 220, and 240, the ID forming/allocating server 300, and the data synchronizing server 400 are connected to the WAN 100 through the LANs 101 and 102. The ID forming/allocating server 300 and the data synchronizing server 400 may be constructed on individual LANs or may be constructed on the same LAN. They may be constructed on the same apparatus.

In the system example illustrated in FIG. 1, the terminals 200, 220, and 240, the ID forming/allocating server 300, and the data synchronizing server 400 on the network are cooperated, thereby realizing the data synchronization among the terminals. The cooperation among the component elements is accomplished by transmitting and receiving an HTTP request (request) among Web APIs held in the terminals 200, 220, and 240, the ID forming/allocating server 300, and the modules of the data synchronizing server 400. It is assumed that in order to prevent a wiretapping or alteration on a communication path, an encryption technique of the communication path such as SSL, TSL, or the like is used in communication among data synchronizing applications 500, 520, and 540, an ID managing module 600, and a data synchronizing module 700, which will be described hereinafter.

Subsequently, a role of each component element will be described. The terminals 200, 220, and 240 are information equipment such as tablets, smart phones, future phones, or the like. The user performs a data reference of the applications, or an addition, change, or deletion of data by operating the terminals. As an example of the data, application data or a file such as schedule, document, photograph, or the like which is used by an application in the terminal can be mentioned. The data which was added, changed, or deleted by the terminal 200 is synchronized with the other terminals 220 and 240 through the data synchronizing server 400.

The ID forming/allocating server 300 is a server (information processing apparatus) for managing an association (interconnection) between the user ID for using the data synchronization service of the data synchronizing server 400 and the possessive terminals of the user. The ID forming/allocating server 300 provides a service for dynamically forming child user IDs corresponding to a combination of the possessive terminals of the user in accordance with a request and allocating to the terminals. A method of forming the user ID and the child user IDs and managing the terminals will be described hereinafter.

Figure 2:
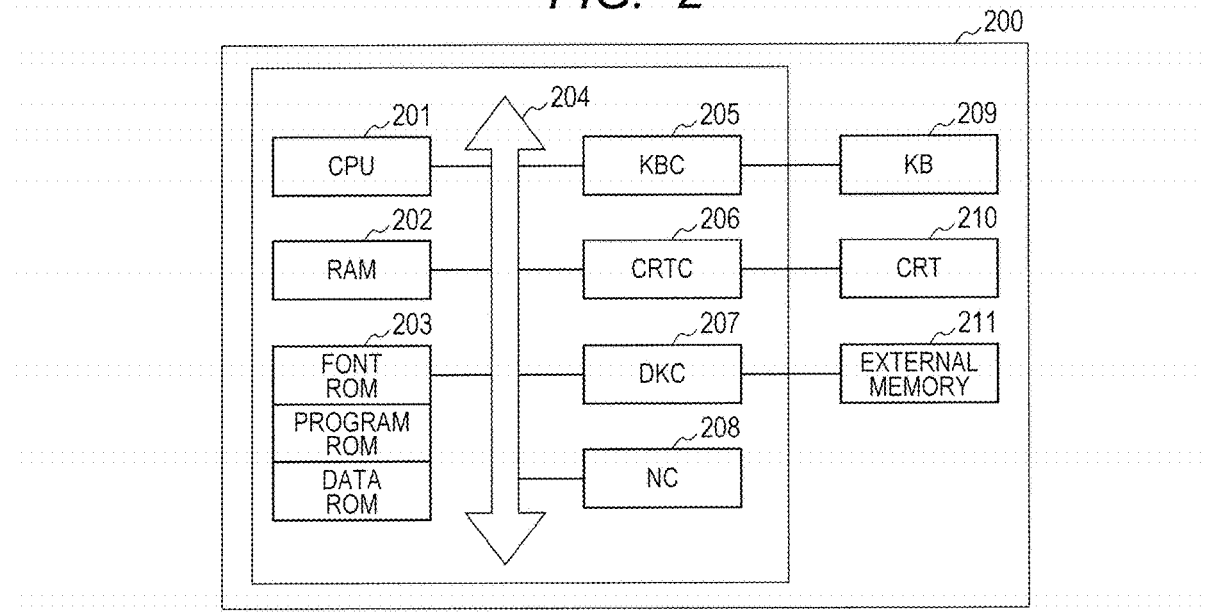
FIG. 2 is a diagram illustrating a hardware construction of an apparatus which uses or provides a service according to the embodiment.

FIG. 2 is a diagram illustrating a construction of an apparatus for using or providing a service according to the embodiment. A hardware block diagram illustrated in FIG. 2 corresponds to a hardware block diagram of the general information processing apparatus. The hardware construction of the general information processing apparatus can be applied to the terminals 200, 220, and 240, the ID forming/allocating server 300, and the data synchronizing server 400 in the embodiment.

In FIG. 2, a CPU 201 executes a program such as OS, application, or the like which has been stored in a program ROM in a ROM 203 or has been loaded from an external memory 211 into a RAM 202. "OS" is an abbreviation of an operating system which operates on a computer and each process, which will be described hereinafter, can be executed by executing such a program. The RAM 202 functions as a main memory, a work area, or the like of the CPU 201. A keyboard controller (KBC) 205 controls a key input from a keyboard (KB) 209 or a pointing device (not shown). A display controller (CRTC) 206 controls a display of a display (CRT) 210. A disk controller (DKC) 207 controls a data access in the external memory 211 (hard disk, silicon disk (SSD), or the like) for storing various kinds of data. A network controller (NC) 208 is connected to a network and executes a communication controlling process of communication with other apparatuses connected to the network. In all descriptions which will be made hereinafter, a main unit on the hardware for execution is the CPU 201 and a main unit on the software is an application program installed in the external memory 211 unless otherwise specified.

Figure 3:
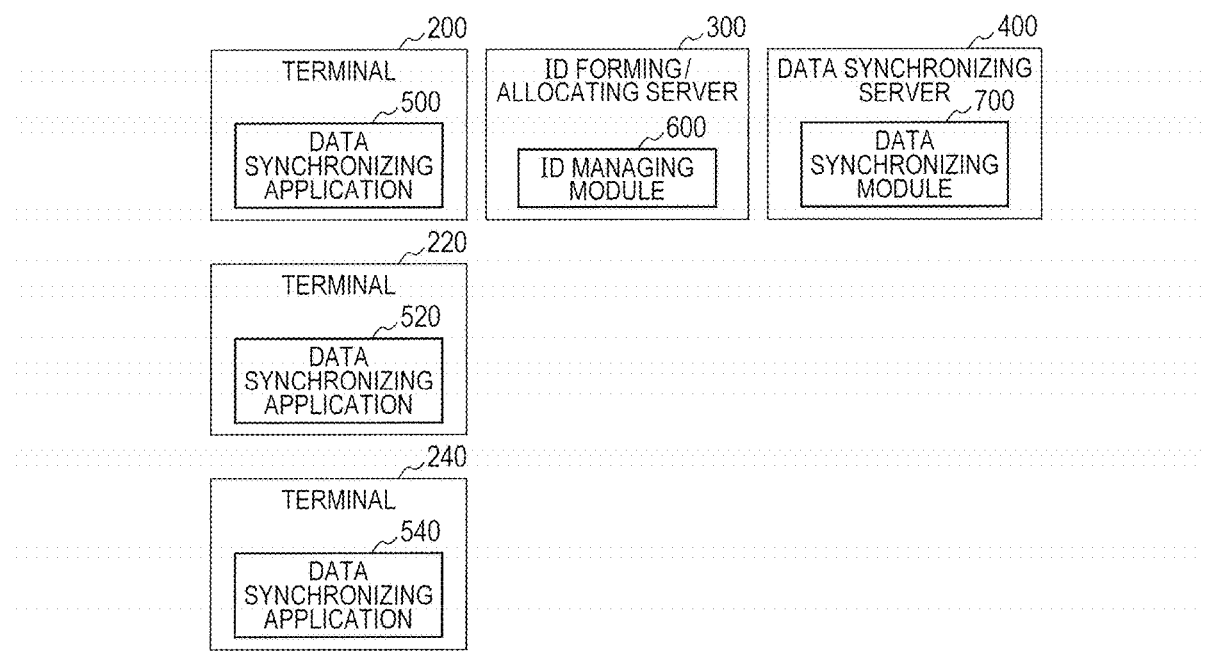
FIG. 3 is a diagram illustrating a software module construction of each apparatus according to the embodiment.

FIG. 3 is a diagram illustrating a software module construction of each apparatus according to the embodiment. The terminals 200, 220, and 240 have the data synchronizing applications 500, 520, and 540, respectively. The ID forming/allocating server 300 has the ID managing module 600. The data synchronizing server 400 has the data synchronizing module 700. Each module has been installed as an application program in the external memory 211 of each hardware. A process of each module will be described in detail hereinlater.

Tables 1a, 1b, and 1c are data tables which are stored in the external memory 211 by the ID forming/allocating server 300. It is also possible to construct in such a manner that those data tables are not stored in the external memory 211 of the ID forming/allocating server 300 but are stored into another server constructed so that it can communicate through the LAN 101.

Table 1a shows a user management table 1000 comprising a user ID 1001, a parent user ID 1002, a password 1003, and another service password 1004. In this table, a combination of the user ID 1001 and the password 1003 for using an ID forming/allocating service is managed. The ID forming/allocating server 300 verifies the combination of information of the user ID 1001 and the password 1003. If it is correct, the server 300 forms authentication information, thereby authenticating the user of the ID forming/allocating server 300. The user management table 1000 manages a combination of the parent user ID 1002 and the password 1003 for using the data synchronizing service. Use during the process of the user management table 1000 will be described hereinafter.

TABLE 1a

User management table 1000

| User ID | Parent user ID | Password | Another service password |
|---------|----------------|----------|--------------------------|
| uid000000001 | — | ***** | oQq9QNoZGSnzv8j |
| uid000000002 | — | ***** | goEJXX06xyjLOhm |
| uid000000001 cid00000001 | uid000000001 | ***** | wIUD0uFLLEqdmbW |
| uid000000001 cid00000002 | uid000000001 | ***** | 6yqiSF5KtgTDkVI |
| uid000000002 cid00000001 | uid000000002 | ***** | bUU7bUaZP5Blbhg |

Table 1b shows a terminal management table 1100 comprising a terminal ID 1101, a terminal name 1102, and a user ID 1103. In this table, in order to manage the owner of the terminal, the user ID 1103 and the terminal ID 1101 are stored in association with each other. Use during the process of the terminal management table 1100 will be described hereinafter.

TABLE 1b

Terminal management table 1100

| Terminal ID | Terminal name | User ID |
|-------------|---------------|---------|
| dev000000001 | Terminal 1 | uid000000001 |
| dev000000002 | Terminal 2 | uid000000001 |
| dev000000003 | Terminal 3 | uid000000001 |
| dev000000004 | Terminal 4 | uid000000001 |

TABLE 1b-continued

Terminal management table 1100

| Terminal ID | Terminal name | User ID |
|-------------|---------------|---------|
| dev000000005 | Terminal 1 of userB | uid000000002 |
| dev000000006 | Terminal 2 of userB | uid000000002 |
| dev000000007 | Terminal 3 of userB | uid000000002 |

Table 1c shows an ID/terminal mapping table 1200 comprising a child user ID 1201, a user ID 1202, and a terminal mapping 1203. In this table, combination information of the child user ID 1201 and the terminal of the user who uses the data synchronizing service is managed in association with each other. Use during the process of the ID/terminal mapping table 1200 will be described hereinafter.

TABLE 1c

ID/terminal mapping table 1200

| Child user ID | User ID | Terminal mapping |
|---------------|---------|------------------|
| uid00000001 cid00000001 | uid000000001 | dev000000001, dev000000002 |
| uid00000001 cid00000002 | uid000000001 | dev000000003, dev000000004 |
| uid00000002 cid00000001 | uid000000002 | dev000000005, dev000000006 |

Tables 2a and 2b show data tables which are stored in the external memory 211 by the data synchronizing server 400. It is also possible to construct in such a manner that those data tables are not stored in the external memory 211 of the data synchronizing server 400 but are stored into another server constructed so that it can communicate through the LAN 102.

Table 2a shows a user management table 1300 comprising a user ID 1301 and a password 1302. In this table 1300, a combination of the user ID 1301 and the password 1302 for using the data synchronizing service is managed. The data synchronizing server 400 verifies the combination of information of the user ID 1301 and the password 1302. If it is correct, the server 400 forms authentication information, thereby authenticating the user of the data synchronizing server 400. Use during the process of the user management table 1300 will be described hereinafter.

TABLE 2a

Table 2a — User management table (1300)

| User ID (1301) | Password (1302) |
|---|---|
| uid000000001 | ***** |
| uid000000002 | ***** |
| uid000000001 cid00000001 | ***** |
| uid000000001 cid00000002 | ***** |
| uid000000002 cid00000001 | ***** |

Table 2b shows a synchronization data management table 1400 comprising a data ID 1401, a user ID 1402, an updating section 1403, a file pass 1404, a file name 1405, and an updating time/date 1406. This table is used to allow the data of the data synchronizing application 500 to be synchronized among a plurality of terminals. Use during the process of the synchronization data management table 1400 will be described hereinafter.

TABLE 2b

Synchronization data management table (1400)

| Data ID (1401) | User ID (1402) | Updating section (1403) |
|---|---|---|
| dev00000001_sync0000001 | uid000000001 cid00000001 | Addition |
| dev00000001_sync0000001 | uid000000001 cid00000001 | Updating |
| dev00000001_sync0000001 | uid000000001 cid00000001 | Deletion |

| File pass (1404) | File name (1405) | Updatng time/date (1406) |
|---|---|---|
| /test/ | addfile.txt | Thu. 9 Oct. 2014 13:25:45 +0000 (UTC) |
| /test2/ | updatefile.txt | Thu. 9 Oct. 2014 13:25:45 +0000 (UTC) |
| /test3/ | delfile.txt | Thu. 9 Oct. 2014 13:25:45 +0000 (UTC) | ticating end point of the ID managing module 600 (S4.2). A combination of the user ID and the password is included in the authenticating request. The ID managing module 600 obtains a combination of the user ID and the password included in the authenticating request and verifies whether or not the obtained combination of the user ID and the password coincides with the information registered in the user management table 1000. If the combination of the user ID and the password coincides with the information, it is decided that the authentication is successful. If it does not coincide, it is decided that the authentication has failed.

The ID managing module 600 returns an authentication result to the data synchronizing application 500 (S4.3). In the case of the authentication success, the data synchronizing application 500 advances to a process of S4.4. In the case of the authentication failure, the data synchronizing application 500 displays a message of an authentication error onto a terminal screen and urges the user to confirm again whether or not there is no setting mistake of the user ID or the password. A description will be made hereinbelow on the assumption that the authentication is successful.

After the authentication success to the ID forming/allocating service, in order to obtain a list of the possessive terminals of the user, the data synchronizing application 500 transmits a possessive terminal list obtaining request to a URL of a terminal list obtaining end point of the ID managing module 600 (S4.4). An authenticating session and the user ID of the user who obtains a terminal list are included in the terminal list obtaining request. When the terminal list obtaining request is received, the ID managing module 600 executes a next process in order to obtain the possessive terminal list of the user. That is, such a record that the user ID included in the terminal list obtaining request and the user ID 1103 coincide is obtained with reference to the terminal management table 1100 in Table 1b. The ID managing module 600 returns the obtained possessive terminal list of the user to the data synchronizing application 500 (S4.5).

Figure 4:
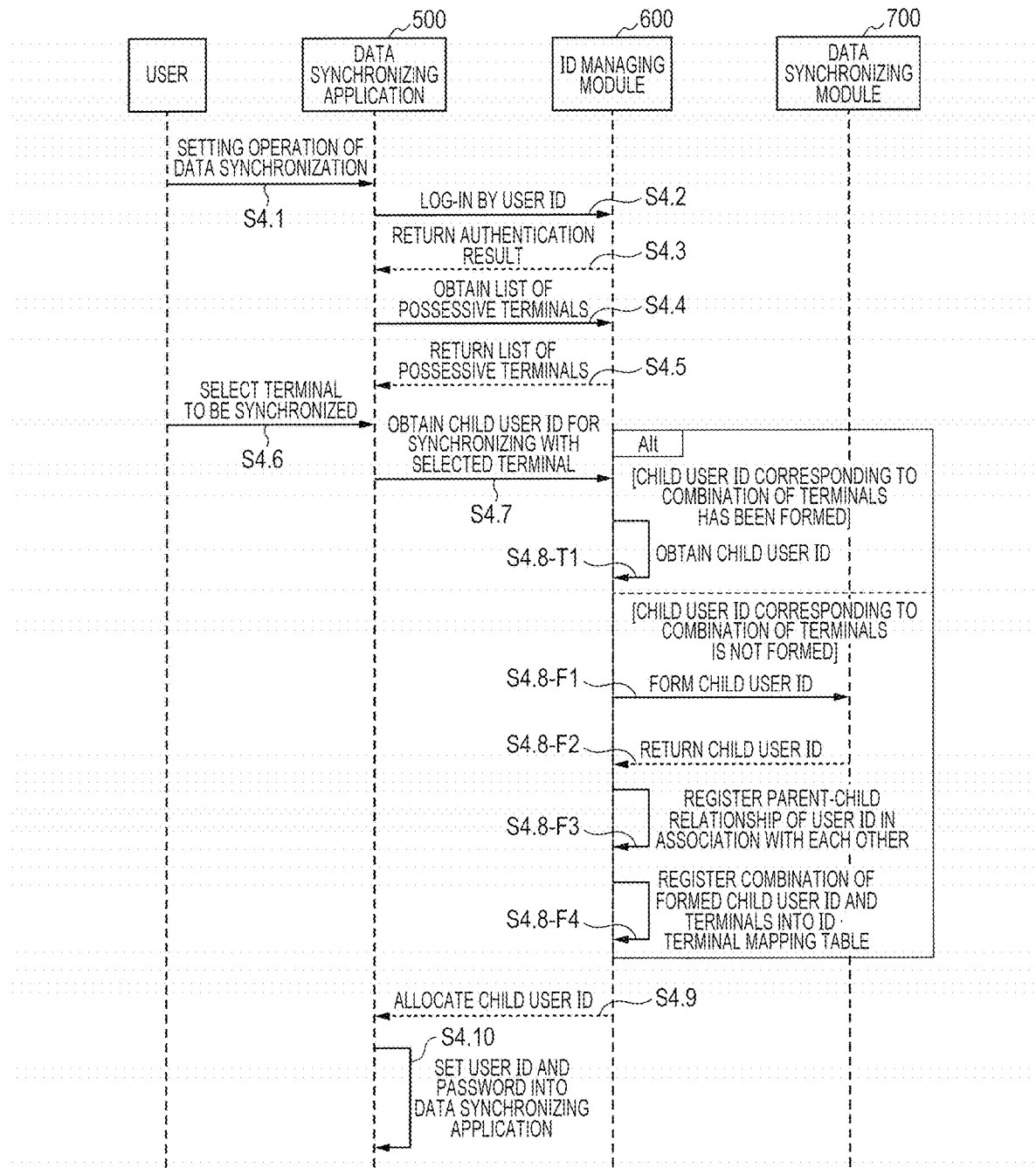
FIG. 4 is a sequence diagram of the ID forming/allocating operation at the time of setting a data synchronization according to the embodiment.

FIG. 4 is a sequence diagram illustrating the operation at the time of setting the data synchronization according to the embodiment. In order to use the data synchronizing service, it is necessary to set the user IDs for using the data synchronizing service into the data synchronizing applications 500, 520, and 540 of the terminals 200, 220, and 240, respectively. In this example, the user IDs are set into the data synchronizing applications 500, 520, and 540 by using the ID managing module 600 of the ID forming/allocating server 300. The operation at the time of setting the data synchronization will be described in detail hereinbelow.

First, the terminal 200 receives the setting of the data synchronization of the data synchronizing application 500 by a data synchronization setting screen 1801 illustrated in FIG. 5A (S4.1). The data synchronizing application 500 transmits an authenticating request to a URL of an authen- After the possessive terminal list of the user was received, the data synchronizing application 500 displays a synchronization terminal selecting screen 1802 illustrated in FIG.

5B onto a display screen of the terminal 200 and receives the selecting operation of the terminals to which a data synchronization is performed from the terminal list displayed on the selecting screen 1802 (S4.6). The data synchronizing application 500 transmits a child user ID obtaining request for synchronizing the data with a combination of the selected terminals (S4.7). An authenticating session, a user ID, and terminal IDs of a plurality of designated terminals are included in the child user ID obtaining request.

The ID managing module 600 executes a process of S4.8 in order to confirm whether or not the child user ID corresponding to the combination of the terminals has already been formed. First, a record which coincides with a certain condition is searched for with reference to the ID/terminal mapping table 1200 shown in Table 1c. That is, such a record that the user ID included in the child user ID obtaining request (S4.7) and the user ID 1202 coincide and the combination of the terminal IDs included in the child user ID obtaining request coincides with the terminal mapping 1203 is searched for. If the record which coincides with the condition was found out, the child user ID corresponding to the combination of the terminals has already been formed. In such a case, the ID managing module 600 obtains the child user ID 1201 associated with the combination of the designated terminals (S4.8-T1).

If the record which coincides with the condition is not found out, this means that the system is in a state where the child user ID corresponding to the combination of the terminals is not formed. In such a case, in order to form the child user ID, the ID managing module 600 transmits a new user registering request to the data synchronizing module 700 (S4.8-F1). Such a combination of the child user ID and the password that the user wants to register into the data synchronizing service is included in the new user registering request. For convenience of description, it is assumed that the child user ID is an ID in which the user ID and a branch number showing the child user ID are combined as shown in the user ID 1001 in Table 1a. It is assumed that the password is a character train in a range from a few characters to tens of characters formed by random numbers. It is not always necessary that the child user ID which is registered into the data synchronizing service is set to the foregoing value so long as it does not overlap with the values which have already been registered in the user ID 1301 in the user management table of the data synchronizing service in Table 2a. With reference to the user management table 1300 in Table 2a, the data synchronizing module 700 discriminates whether or not the user ID included in the new user registering request overlaps with the user ID 1301 which has already been registered in the user management table 1300. If it does not overlap, the user ID succeeded from the request is stored in the user ID 1301 in the user management table 1300. The password succeeded from the request is also stored in the password 1302 in the user management table 1300. The data synchronizing module 700 returns information showing that the child user ID has successfully been registered, as a result, to the ID managing module 600 (S4.8-F2).

The ID managing module 600 executes a next process to the user management table 1000 shown in Table 1a (S4.8-F3). That is, in the information succeeded from S4.8-F2, the child user ID is stored into the user ID 1001, the user ID is stored into the parent user ID 1002, and the password is stored into the password 1003. The password used in S4.8-F1 is stored from S4.8-F2 into another service password 1004. Further, the ID managing module 600 returns a combination of the child user ID and the terminal formed in the ID/terminal mapping table 1200 shown in Table 1c (S4.8-F4).

The ID managing module 600 returns the child user ID and the password succeeded from S4.8-F2 to the data synchronizing application 500 (S4.9). The data synchronizing application 500 sets the allocated child user ID and password into the data synchronizing application (S4.10).

Figure 6:
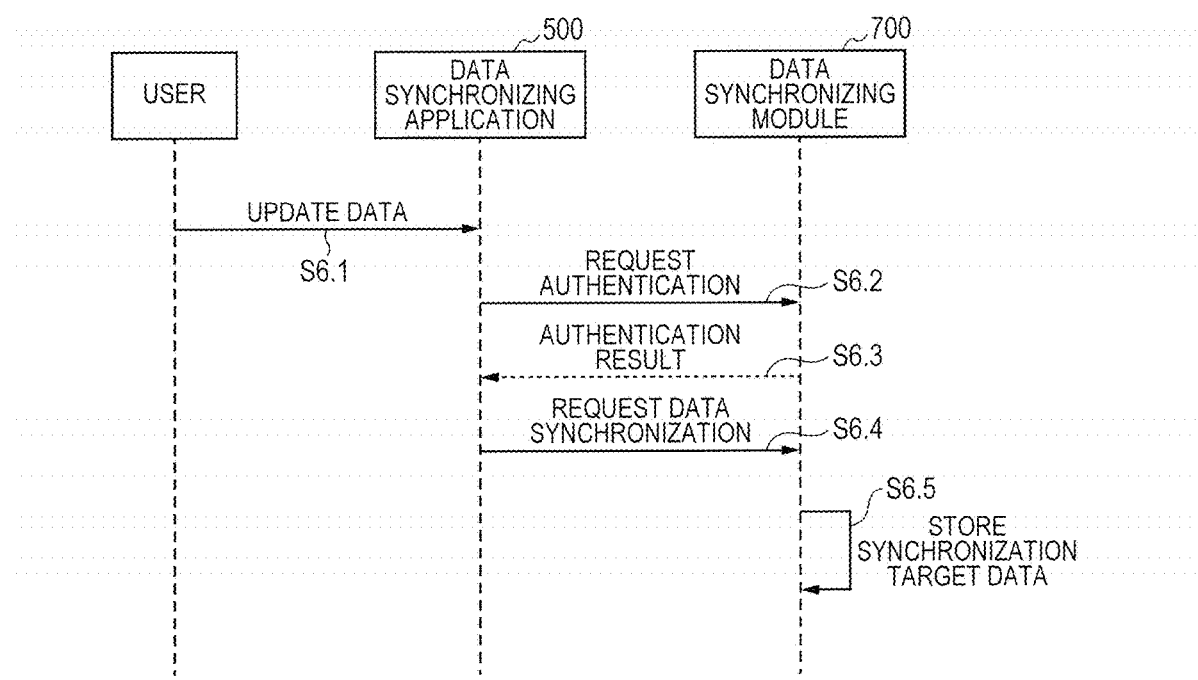
FIG. 6 is a sequence diagram for the data uploading operation according to the embodiment.

FIG. 6 is a diagram illustrating a sequence for the data uploading operation according to the embodiment. This process is executed on the assumption that the data synchronization setting of a document managing application has previously been performed between the specific terminals by the setting of the data synchronization described in FIG. 4 as a prerequisite. The operation of each module in the data uploading process will be described in detail hereinbelow.

First, the user operates the terminal 200 and adds, updates, or deletes the data or file which is managed by the data synchronizing application 500 (S6.1). This operation is called a "data updating of the terminal 200" hereinbelow. The data synchronizing application 500 detects the data updating of the terminal 200 and transmits the authenticating request to a URL of an authenticating end point of the data synchronizing module 700 (S6.2). A combination of the child user ID and the password allocated to the data synchronizing application 500 by the setting of the data synchronization is included in the authenticating request. The data synchronizing module 700 verifies whether or not the received combination of the child user ID and the password coincides with the information registered in the user management table 1300. If it coincides, it is decided that the authentication is successful. If it does not coincide, it is decided that the authentication has failed. The data synchronizing module 700 returns an authentication to the data synchronizing application 500 (S6.3).

The data synchronizing application 500 transmits the data synchronizing request to the data synchronizing module 700 (S6.4). The user ID of the terminal owner, the terminal ID, data updating contents in the terminal 200, a file pass, and a file name are included in the data synchronizing request. The data updating contents in the terminal 200 indicates that the data updating is which one of the adding, updating, and deleting operations. The file pass is a relative pass from the directory subordinates managed by the data synchronizing application 500. The terminal ID and the unique ID are collectively called a "data ID" hereinbelow. When the data updating contents is addition/updating, the data synchronizing application 500 transmits the file itself to the data synchronizing module 700.

When the synchronization data information is received, the data synchronizing module 700 executes a next process to the synchronization data management table 1400 in order to store the synchronization target data (S6.5). That is, the data ID is stored into the data ID 1401, the user ID of the terminal owner is stored into the user ID 1402, the data updating contents in the terminal 200 is stored into the updating section 1403, the file pass is stored into the file pass 1404, and the file name is stored into the file name 1405, respectively. If the data updating contents is addition/updating, when the file is received from the data synchronizing application 500, the data synchronizing module 700 forms a folder of the name of the data ID in the external memory 211 of the data synchronizing server 400 and stores the received file into the folder. In this manner, the terminal 200 stores the updated data into the data synchronizing server 400.

Figure 7:
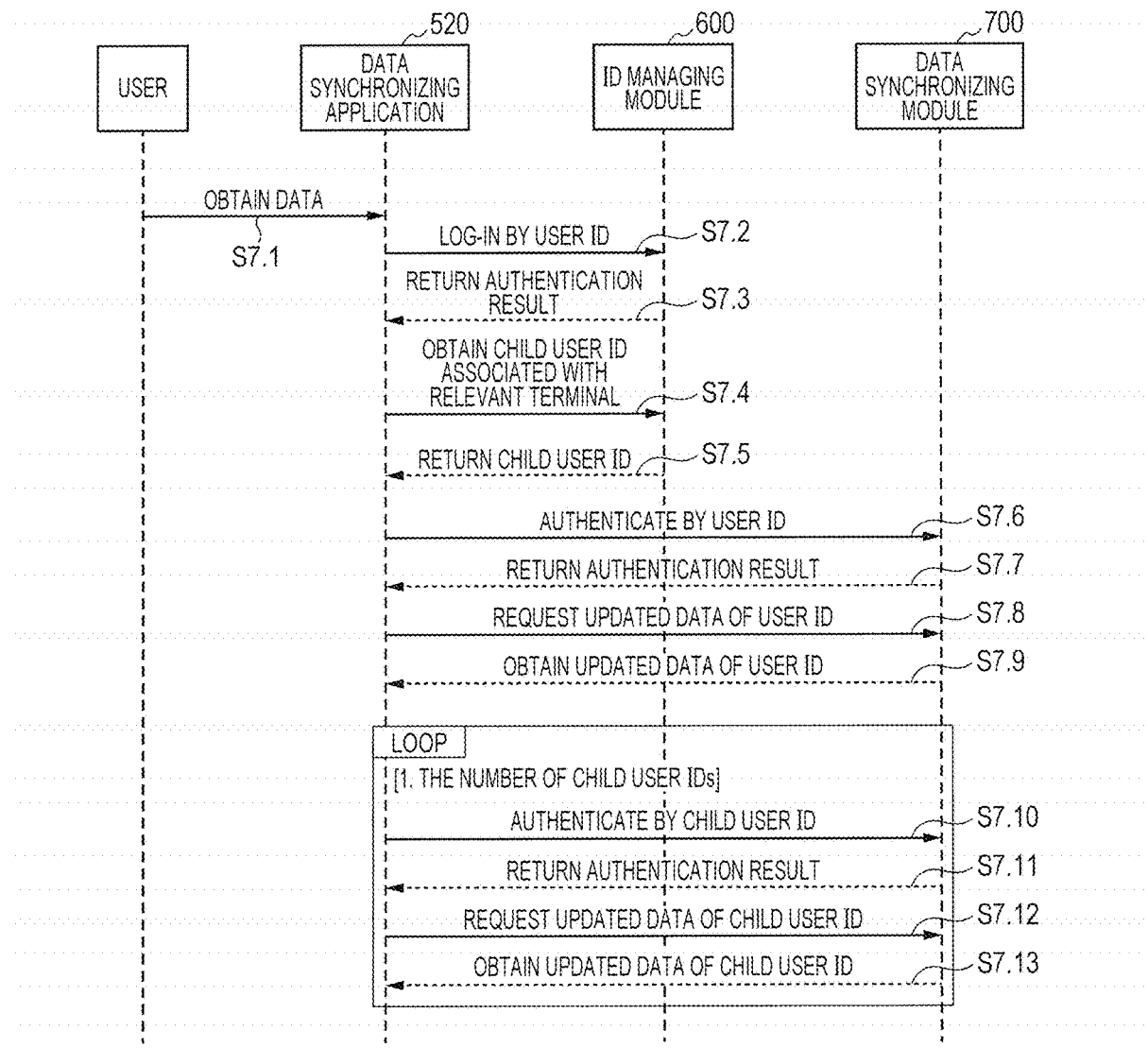
FIG. 7 is a sequence diagram for the data downloading operation according to the embodiment.

FIG. 7 is a diagram showing a sequence for the data downloading operation according to the embodiment. In this instance, a description will be made on the assumption that the downloading operation in the terminal 200 is executed. First, when the data obtaining operation is received from the user, the data synchronizing application 520 starts the data obtaining process (S7.1). It is assumed that the operation of the user here is an activation of the data synchronizing application 520. When the data synchronizing application 520 is activated, the data synchronizing application 520 starts the data obtaining process. In place of such an operation, the activated data synchronizing application 520 may periodically start the data obtaining process in a polling manner. The data synchronizing application 520 may receive a push notification or the like from the data synchronizing module 700 and start the data obtaining process in an event driven manner.

Subsequently, the data synchronizing application 520 transmits the authenticating request to the URL of the authenticating end point of the ID managing module 600 (S7.2). A combination of the user ID and the password of the terminal owner is included in the authenticating request. The ID managing module 600 verifies whether or not the obtained combination of the user ID and the password coincides with the combination of the user ID 1001 and the password 1003 registered in the user management table 1000. If the combination of the user ID and the password received by the authenticating request coincides with the combination of the user ID 1001 and the password 1003 registered in the user management table 1000, it is decided that the authentication is successful. If it does not coincide, it is decided that the authentication has failed. The ID managing module 600 returns an authentication result to the data synchronizing application 520 (S7.3).

In the case of the authentication success, the data synchronizing application 520 transmits a request for obtaining a list of the child user IDs with which the terminal 220 is associated to the ID managing module 600 (S7.4). The user ID of the owner of the terminal 220 and the terminal ID of the terminal 220 are included in such a request. The ID managing module 600 searches the ID/terminal mapping table 1200 and obtains a list which satisfies a predetermined condition. That is, a list of the child user IDs 1201 of the records in which the user ID succeeded from the request and the user ID 1202 coincide and the terminal ID succeeded from the request is included in the terminal mapping 1203 is obtained. Subsequently, the ID managing module 600 searches the user management table 1000 and obtains a record in which the user ID 1001 and the child user ID 1201 included in the list of the child user IDs 1201 obtained by the precedent process coincide. The ID managing module 600 extracts a combination of the user ID 1001 and another service password 1004 from the obtained record and forms a list of the child user IDs and the passwords possessed by the user of the terminal 220. After that, the ID managing module 600 returns the list of the child user IDs and the passwords to the data synchronizing application 520 (S7.5).

The data synchronizing application 520 transmits the authenticating request to the URL of the authenticating end point of the data synchronizing module 700 (S7.6). A combination of the user ID and the password is included in the authenticating request. The data synchronizing module 700 verifies whether or not the received combination of the user ID and the password coincides with the information registered in the user management table 1300. If the combination of the user ID and the password coincides, it is decided that the authentication is successful. If it does not coincide, it is decided that the authentication has failed. The data synchronizing module 700 returns an authentication result to the data synchronizing application 520 (S7.7).

In the case of the authentication success, the data synchronizing application 520 transmits the data obtaining request to the data synchronizing module 700 (S7.8). The user ID, the terminal ID, and the final data obtaining time/date of the data synchronizing application 520 are included as parameters in the data obtaining request. When the data obtaining request is received from the data synchronizing application 520, the data synchronizing module 700 returns the updated data (S7.9). At this time, in order to obtain the data updating contents, the data synchronizing module 700 obtains a record which satisfies a predetermined condition with reference to the synchronization data management table 1400. That is, the data synchronizing module 700 obtains a record in which a value of the user ID 1402 coincides with the user ID succeeded from the data obtaining request (S7.8) and a value of the updating time/date 1406 is later than the obtaining time/date of the final data succeeded from the data obtaining request, and transmits to the data synchronizing application 520.

The data synchronizing application 520 obtains the added/ updated file from the data synchronizing server 400 on the basis of the received data updating contents and reflects to the terminal 220. The data synchronizing application 520 deletes the file of the terminal 220 on the basis of the data updating contents. After that, in S7.10 to S7.13, on the basis of the list of the child user IDs and the passwords obtained by the data synchronizing application 520 in S7.5, the log-in to the data synchronizing module 700 and the process for obtaining the updated data are repeated the number of times as many as the number of child user IDs. Such a process is similar to that in S7.6 to S7.9. In this manner, the terminal 220 obtains the data updated by the user by another possessive terminal from the data synchronizing server 400.

Figure 8:
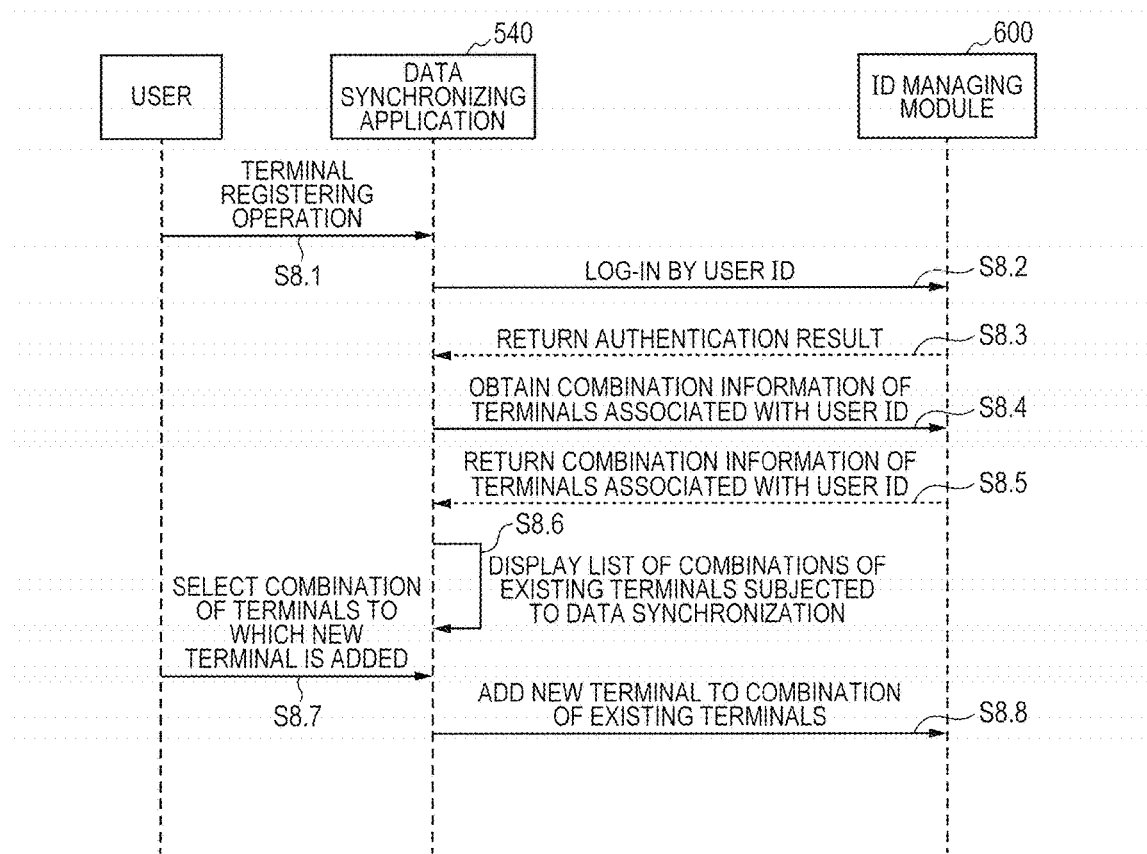
FIG. 8 is a sequence diagram for the new terminal registration according to the embodiment.

FIG. 8 is a diagram illustrating a sequence for registering a new terminal according to the embodiment. A method of newly adding the terminal 240 to the combination of the terminals to which the data synchronization has already been performed will be described here.

Figures 9A, 9B:
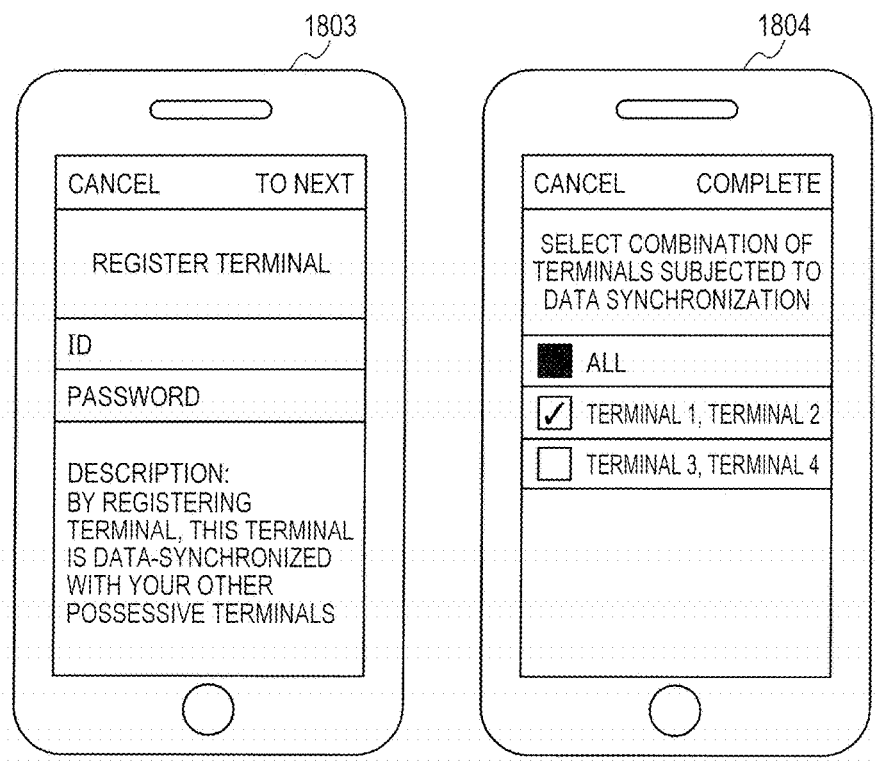
FIGS. 9A and 9B are diagrams illustrating examples of a display screen for the new terminal registration according to the embodiment.

First, the data synchronizing application 540 of the terminal 240 receives the combination of the user ID and the password input to a terminal registering screen 1803 illustrated in FIG. 9A (S8.1). The user ID and the password which are received here are used to log-in to the ID managing module 600. Subsequently, the data synchronizing application 540 transmits the authenticating request to the URL of the authenticating end point of the ID managing module 600 (S8.2). A combination of the user ID and the password of the terminal owner received in S8.1 is included in the authenticating request. The ID managing module 600 verifies whether or not the received combination of the user ID and the password coincides with the combination of the user ID 1001 and the password 1003 registered in the user management table 1000. If it coincides, it is decided that the authentication is successful. If it does not coincide, it is decided that the authentication has failed. The ID managing module 600 returns an authentication result to the data synchronizing application 540 (S8.3).

When the result of the authentication success is received, the data synchronizing application 540 transmits the request for obtaining the combination information of the possessive terminal list of the user and the terminals to which the data synchronization is performed to the ID managing module 600 (S8.4). The user ID of the owner of the terminal 240 is included in such a request. The ID managing module 600 obtains the possessive terminal list of the user with reference to the terminal management table 1100. This list is such a list that the terminal ID 1101 and the terminal name 1102 of the record in which the user ID succeeded from the request of S8.4 and the user ID 1103 coincide are obtained from the terminal management table 1100. Subsequently, the ID managing module 600 obtains the list of the child user IDs possessed by the user. This list is such a list that the user ID 1101 of the record in which the user ID succeeded from the request of S8.4 and the parent user ID 1002 coincide is obtained from the user management table 1000. Subsequently, the ID managing module 600 obtains the combination information of the terminal associated with the child user ID with reference to the ID/terminal mapping table 1200. This information is such information that the terminal mapping 1203 of the record in which the list of the child user IDs possessed by the user and the child user ID 1201 coincide is obtained from the ID/terminal mapping table 1200. Subsequently, the ID managing module 600 collates the obtained possessive terminal list of the user with the combination information of the terminal associated with the child user ID and forms combination information of the terminals to which the data synchronization is performed. The child user ID 1201, the terminal mapping 1203, and the terminal name 1102 corresponding to the terminal ID included in the terminal mapping are included in the combination information of the terminals to which the data synchronization is performed. The ID managing module 600 returns the combination information of the terminals which was formed by the foregoing process and to which the data synchronization is performed to the data synchronizing application 540 (S8.5).

The data synchronizing application 540 displays the combination information of the terminals to which the data synchronization is performed onto a screen 1804 of the list of the terminal combinations illustrated in FIG. 9B (S8.6). The data synchronizing application 540 allows the user to select a combination of the terminals to which a new terminal is added through the list screen 1804 (S8.7). In response to the combination selected in S8.7, the data synchronizing application 540 transmits a request to add the new terminal to the combination of the existing terminals to the ID managing module 600 (S8.8). The user ID of the user who possesses the terminal 240, the terminal ID of the terminal 240, the terminal name of the terminal 240, and the child user ID corresponding to the combination of the terminals selected by the list screen 1804 of the combinations of the terminals are included in the request in S8.8. The ID managing module 600 processes the new terminal as follows by using the values succeeded from the request in order to register it in association with the user ID and the child user ID. That is, the terminal ID is stored into the terminal ID 1101 in the terminal management table 1100, the terminal name is stored into the terminal name 1102 in the same table, and the user ID is stored into the user ID 1103 in the same table, respectively. Further, with reference to the ID/terminal mapping table 1200, the terminal ID obtained from the request is added to the end of the terminal mapping 1203 of the record in which the child user ID succeeded from the request and the child user ID 1201 coincide. By processing as mentioned above, the new terminal 240 can be added to the combination of the existing terminals.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-096283, filed May 11, 2015, which is hereby incorporated by reference herein in its entirety.

What is claimed is:

1. An information processing apparatus for communicating with a plurality of terminals that have same user identification information and that communicate with a server that performs a data synchronization among the plurality of terminals on the basis of the user identification information, the information processing apparatus comprising at least a processor and at least a memory coupled to the at least the processor and having stored thereon instructions, and, when the instructions are executed by the at least the processor, the at least the processor and the at least the memory cooperating to act as:

a first managing unit configured to manage a first table including a parent user identification information and terminal identification information of the plurality of terminals in association with each other;

a providing unit configured to provide a designation screen based on the terminal identification information of the plurality of terminals in association with the parent user identification information included in the first table, the designation screen being used to designate at least one terminal from among a list of the plurality terminals possessed by a user;

a forming unit configured to form a child user identification information for at least one terminal designated by the user through the designation screen;

a registering unit configured to register the formed child user identification information into the server;

a second managing unit configured to manage a second table including the parent user identification information, the child user identification information, and a terminal identification information of the designated at least one terminal in association with each other; and a transmitting unit configured to, in response to reception of the parent user identification information and a request for obtaining the child user identification from one terminal among the designated at least one terminal, specify the child user identification information of the designated at least one terminal based on the second table and a combination of the parent user identification information and the terminal identification information of the one terminal so as to transmit the specified child user identification information to the one terminal, wherein the one terminal is configured to transmit the child user identification information to the server so that the server performs a data synchronization among the designated at least one terminal.

2. An apparatus according to claim 1, when the instructions are executed by the at least the processor, the at least the processor and the at least the memory further cooperating to act as:

a second transmitting unit configured to transmit information showing how the plurality of terminals are combined to a new terminal in response to a request for registering the new terminal; and a receiving unit configured to receive information showing into which one of a plurality of combinations of the plurality of terminals the new terminal is registered from the new terminal in accordance with the transmitted information, wherein the first managing unit and the second managing unit manage the new terminal on the basis of the received information.

3. An apparatus according to claim 1, wherein the forming unit forms the child user identification information by adding another information to the parent user identification information.

4. An information processing method for communicating with a plurality of terminals that have same user identification information and that communicate with a server that performs a data synchronization among the plurality of terminals on the basis of the user identification information, the information processing method comprising:

a first managing step of managing a first table including a parent user identification information and terminal identification information of the plurality of terminals in association with each other;

a providing step of providing a designation screen based on the terminal identification information of the plurality of terminals in association with the parent user identification information included in the first table, the designation screen being used to designate at least one terminal from among a list of the plurality terminals possessed by a user;

a forming step of forming a child user identification information for at least one terminal designated by the user through the designation screen;

a registering step of registering the formed child user identification information into the server;

a second managing step of managing a second table including the parent user identification information, the child user identification information, and a terminal identification information of the designated at least one terminal in association with each other; and a transmitting step, in response to reception of the parent user identification information and a request for obtaining the child user identification from one terminal among the designated at least one terminal, of specifying the child user identification information of the designated at least one terminal based on the second table and a combination of the parent user identification information and the terminal identification information of the one terminal so as to transmit the specified child user identification information to the one terminal, wherein the one terminal is configured to transmit the child user identification information to the server so that the server performs a data synchronization among the designated at least one terminal.

* * * * *